(12) United States Patent
Weinberg et al.

(10) Patent No.: US 9,482,553 B2
(45) Date of Patent: Nov. 1, 2016

(54) CALIBRATION SYSTEMS AND METHODS FOR GYROSCOPES

(71) Applicant: THE CHARLES STARK DRAPER LABORATORY, INC., Cambridge, MA (US)

(72) Inventors: Marc S. Weinberg, Needham, MA (US); Eugene H. Cook, Melrose, MA (US); Stephen L. Finberg, Cambridge, MA (US); Murali V. Chaparala, Newton, MA (US); Thayne R. Henry, Waltham, MA (US); Thomas A. Campbell, Cambridge, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 184 days.

(21) Appl. No.: 14/501,083

(22) Filed: Sep. 30, 2014

(65) Prior Publication Data

US 2016/0091339 A1 Mar. 31, 2016

(51) Int. Cl.
*G01C 25/00* (2006.01)
*G01C 19/56* (2012.01)

(52) U.S. Cl.
CPC ............... *G01C 25/00* (2013.01); *G01C 19/56* (2013.01)

(58) Field of Classification Search
CPC .... G01C 25/00; G01C 25/005; G01C 19/00; G01C 19/56; G01C 19/5614; G01C 19/567; G01C 19/5649; G01C 19/5726; G01C 19/5776
See application file for complete search history.

(56) References Cited

U.S. PATENT DOCUMENTS

| 9,157,739 B1 * | 10/2015 | Beitia ..................... G01C 25/00 |
| 2015/0285658 A1 * | 10/2015 | Zotov ................ G01C 19/5776 73/1.77 |
| 2016/0018243 A1 * | 1/2016 | Okon ..................... G01C 25/00 73/1.77 |

FOREIGN PATENT DOCUMENTS

| EP | EP 2166308 A1 * | 3/2010 | ......... G01C 19/5684 |
| GB | WO 2004046650 A1 * | 6/2004 | ........... G01C 19/567 |

* cited by examiner

*Primary Examiner* — Nguyen Ha
(74) *Attorney, Agent, or Firm* — Lando & Anastasi, LLP

(57) ABSTRACT

Methods and apparatus for calibrating a gyroscope without rotating the instrument. In one example, a calibration method includes operating the gyroscope in a self-oscillation loop to generate x-axis and y-axis drive signals, adding forcing signals to the x-axis and y-axis drive signals to produce pick-off x-axis and y-axis signals, measuring the pick-off x-axis and y-axis signals to produce measurement data, determining a relative phase between the pick-off x-axis and y-axis signals, based on the measurement data and the relative phase, estimating parameters of the gyroscope, based on the measurement data and the estimated parameters, calculating estimated position signals to calibrate the gyroscope.

11 Claims, 10 Drawing Sheets

CALIBRATION SYSTEMS AND METHODS FOR GYROSCOPES

FEDERALLY SPONSORED RESEARCH

This invention was made with government support under N66001-12-C-4033 awarded by the Department of the Navy. The government has certain rights in the invention.

BACKGROUND

Gyroscopes are typically calibrated at the factory upon completion of manufacture. However, recalibration is often required at later times. Maintaining gyroscope calibration is done using expensive instruments, by building expensive and massive gimbals into inertial systems to allow rotation, or by removing the gyroscope sensor and returning it to a factory or test facility for recalibration. There are numerous costs and/or down time associated with conventional recalibration. In particular, accurate bias and scale factor at mission time are generally realized either by using more accurate gyroscope sensors or by rotating the sensors. More accurate gyroscopes are generally more expensive and much larger and consume more power. Rotating the gyroscope sensor requires either costly gimbals which increase the system size, or removal of the sensor or inertial measurement unit such that it can be recalibrated on a suitable test station.

SUMMARY OF THE INVENTION

Aspects and embodiments are directed to a calibration system and methods for gyroscopes that do not require the use of gimbals or rotary stages. The system and methods disclosed herein are widely applicable to symmetric and non-symmetric gyroscopes, including ring gyroscopes, MEMS gyroscopes, and others, and may also be useful in a variety of other applications.

One embodiment is directed to a method of calibrating a gyroscope having an x-axis and a y-axis and including an oscillator loop and a feedback loop. The method may comprise applying off-resonant voltage signals to the gyroscope with the oscillator loop and the feedback loop turned off and measuring feed forward terms, determining a pick-off relative phase angle between the x-axis and the y-axis, configuring the gyroscope with the oscillator loop on the x-axis and the y-axis as a closed-loop sensing channel, exciting gyroscope sidebands using a plurality of equally spaced input frequencies and recording data as a function of time, the data including the input frequencies, an x-axis drive voltage ($V_{fx}$), a y-axis drive voltage ($V_{fy}$), an x-axis pick-off voltage ($V_x$), a y-axis pick-off voltage ($V_y$), and a phase reference voltage, processing the data into a data table, running a parameter estimation process using the data table to estimate parameters of the gyroscope, and calculating a relative pick-off magnitude between the x-axis and the y-axis, a cross-damping coefficient, a cross-stiffness coefficient, and an input angular rate of the gyroscope based on the pick-off relative phase angle and the estimated parameters of the gyroscope.

In one example in which the gyroscope is a ring gyroscope, determining the pick-off relative phase angle includes exciting the gyroscope ring with an off-resonant frequency. In another example, the method further comprises reconfiguring the gyroscope with the oscillator loop on the y-axis and the x-axis as the closed-loop sensing channel, and repeating the step of exciting the gyroscope sidebands and recording the data. In one example, running the parameter estimation process includes estimating forcing signal coupling terms, damping terms, cross-damping terms, cross-stiffness terms, and a phase variation of the oscillator loop from $-\pi/2$.

According to another embodiment, a method of calibrating a gyroscope comprises operating the gyroscope in a self-oscillation loop to generate x-axis and y-axis drive signals, adding forcing signals to the x-axis and y-axis drive signals to produce pick-off x-axis and y-axis signals, measuring the pick-off x-axis and y-axis signals to produce measurement data, determining a relative phase between the pick-off x-axis and y-axis signals, based on the measurement data and the relative phase, estimating parameters of the gyroscope, and based on the measurement data and the estimated parameters, calculating estimated position signals to calibrate the gyroscope.

In one example, the method further comprises removing feed forward noise from the pick-off x-axis and y-axis signals. In another example, the method further comprises adding side-band signals to the pick-off x-axis and y-axis signals. In another example, operating the gyroscope in the self-oscillation loop includes configuring the gyroscope with the self-oscillation loop on the x-axis and the y-axis as a closed-loop sensing channel. In another example, operating gyroscope in the self-oscillation loop includes applying off-resonant voltage signals to the gyroscope and measuring feed forward terms. The method may further comprise exciting gyroscope sidebands using a plurality of input frequencies and recording the measurement data as a function of time, the measurement data including the input frequencies, an x-axis drive voltage ($V_{fx}$), a y-axis drive voltage ($V_{fy}$), an x-axis pick-off voltage ($V_x$), a y-axis pick-off voltage ($V_y$), and a phase reference voltage. In one example, the plurality of input frequencies are equally spaced. The method may further comprise reversing the axes of the self-oscillation loop and the closed-loop sensing channel, and repeating the step of exciting the gyroscope sidebands to produce second measurement data, the second measurement data including a reversed x-axis drive voltage, a reversed y-axis drive voltage, a reversed x-axis pick-off voltage, a reversed y-axis pick-off voltage ($V_{fy}$), and a reversed phase reference voltage. In another example, the method further comprises, based on the measurement data and the estimated parameters, determining an angular rate of the gyroscope. In one example, estimating the parameters includes estimating coupling terms of the sideband forcing signals, damping terms, cross-damping terms, cross-stiffness terms, a phase variation of the oscillator loop from $-\pi/2$, and a magnitude of a ratio of the pick-off x-axis and y-axis signals. The coupling terms of the sideband forcing signals may include forcing signal misalignments. In another example, adding the sideband forcing signals includes modulating the pick-off x-axis and y-axis signals.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
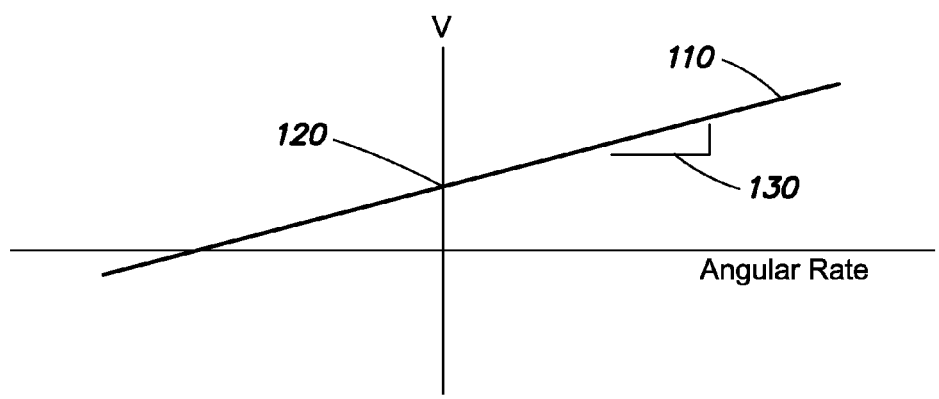
FIG. 1 is a graph illustrating the input and output characteristics of a gyroscope.

Aspects and embodiments are directed to hardware and software configured to calibrate the bias and scale factor of a gyroscope (for example, a ring gyroscope or tuning fork gyroscope) without rotating the gyroscope. FIG. 1 is a graph illustrating the input and output characteristics of a gyroscope. In FIG. 1, the baseband output voltage (V) of the gyroscope (vertical axis) is plotted as a function of the angular rate of rotation (horizontal axis), producing trace 110. The bias 120 is the offset of trace 110 on the vertical axis at the point at which trace 110 crosses the vertical axis, and the scale factor 130 is the slope of trace 110 (i.e., the rate of change of V as a function of angular rate). Nonlinear scale factor terms are assumed to be small and compensated by one-time factory calibration.

Figure 2:
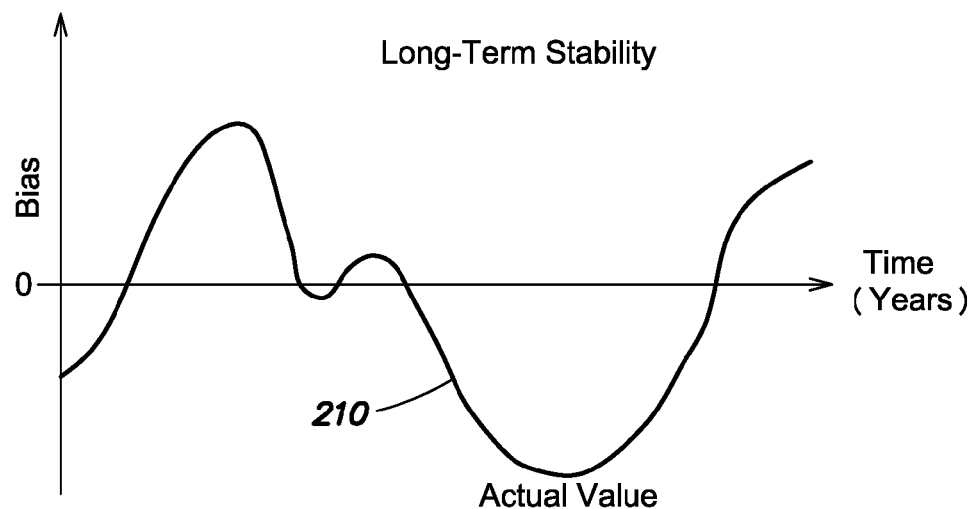
FIG. 2 is a graph illustrating an example of gyroscope sensor drift over time.
Figure 2:
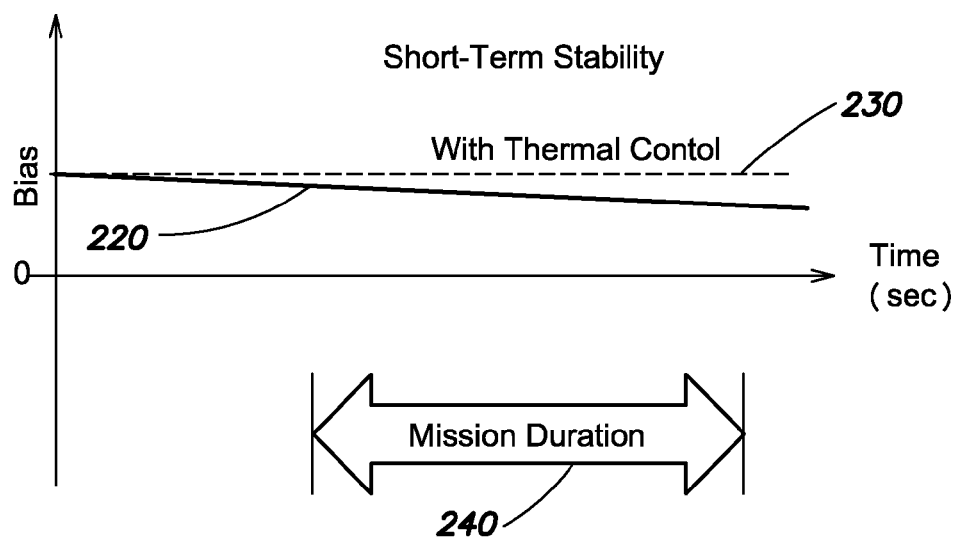

As discussed above, gyroscopes are typically calibrated at the factory. However, after factory calibration, the gyroscopes may be in storage for many years, whereas the missions in which the gyroscopes are used may last for minutes or several hours. Knowing calibration of the gyroscope after long periods of time may be of critical importance in inertial guidance applications, particularly with strap down systems. As illustrated in FIG. 2, the gyroscope sensor drift over years (represented by trace 210) is typically much greater than the drift over a short time period (represented by trace 220). This is particularly true when the sensor or system is thermally controlled for the short time period (represented by trace 230), for example corresponding to the time of a mission in which the gyroscope is used (e.g., mission time 240). For high performance sensors, it is generally desirable to calibrate bias, accounting for earth rate, and to calibrate the scale factor. Although gyroscopes are further described by additional parameters, such as misalignment and nonlinearities, the bias and scale factor generally have the most variation over time and environment. Accordingly, aspects and embodiments are directed to hardware and software (algorithms) configured to calibrate gyroscope bias (separate bias from earth rate) and scale factor without rotating the sensor. As discussed further below, a technique according to certain embodiments adds forcing signals (sidebands) to the typical forces generated for gyroscope self oscillation. Parameter estimation yields the bias and scale factor parameters used in normal closed-loop sensing and to calibrate the sensor, as discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 3A:
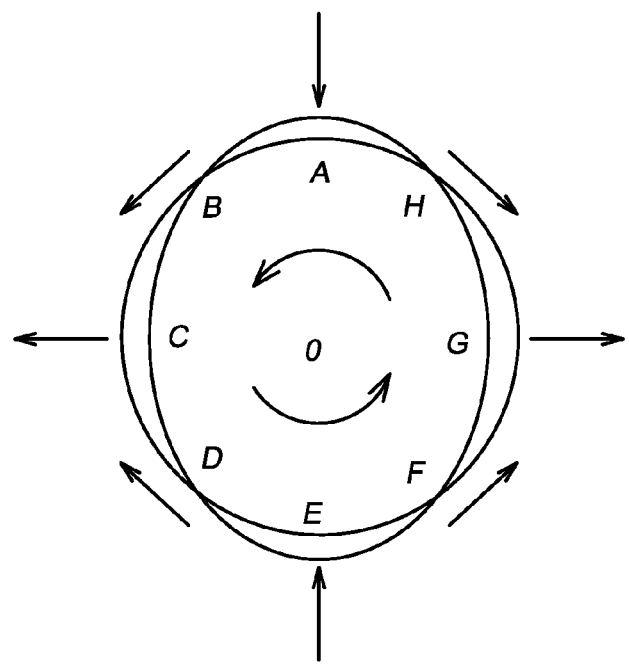
FIG. 3A is a schematic diagram illustrating the modal patterns of a symmetric vibrating gyroscope.
Figure 3B:
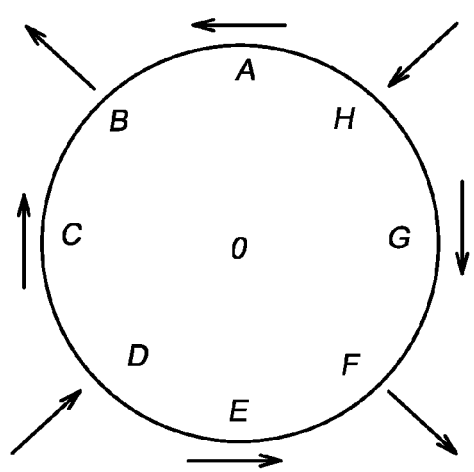
FIG. 3B is a schematic diagram illustrating the corresponding Coriolis accelerations for the symmetric vibrating gyroscope of FIG. 3A.
Figure 3C:
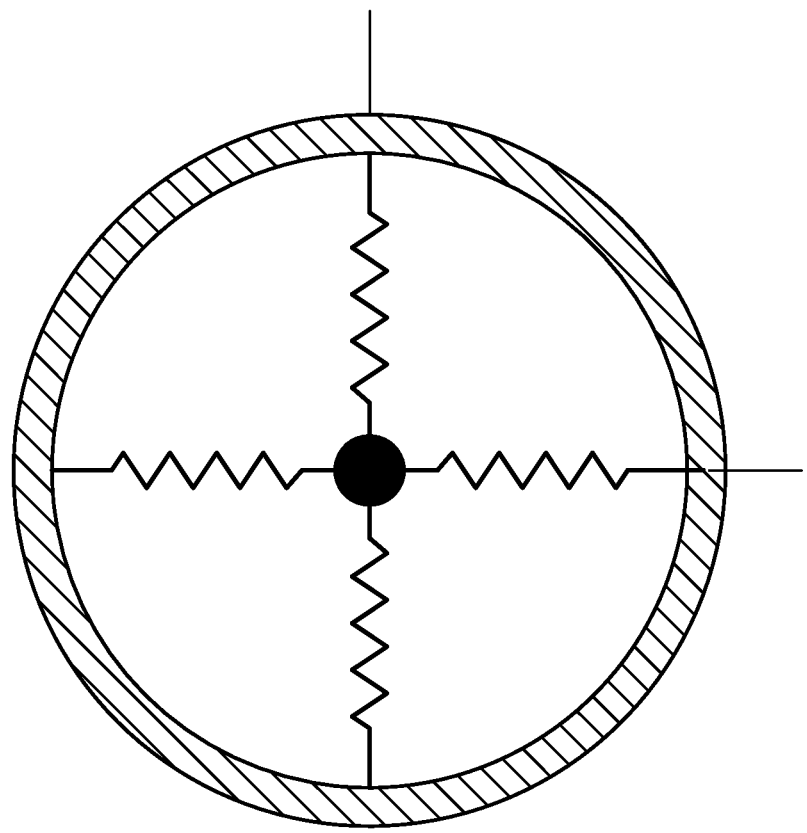
FIG. 3C is a schematic diagram illustrating one example of a simple model for a two-dimensional oscillator.

FIG. 3A illustrates the modal patterns of a symmetric vibrating gyroscope, such as a ring gyroscope, for example. FIG. 3B illustrates the corresponding Coriolis accelerations for the symmetric vibrating gyroscope. FIG. 3C illustrates an example of a simple model for a two-dimensional oscillator, as may be used to model the symmetric vibrating gyroscope of FIG. 3A. With reference to FIGS. 3A-C, the Equations of motion for a vibrating gyroscope (such as a ring or tuning fork gyroscope, for example) may be written as:

$$\frac{d}{dt}\begin{bmatrix} P_x \dot{x} \\ P_y \dot{y} \\ P_x x \\ P_y y \end{bmatrix} = \begin{bmatrix} -\frac{b_x}{m} & -b_{xy1} & -\frac{k_x}{m} & -k_{xy1} \\ -b_{xy2} & -\frac{b_y}{m} & -k_{xy2} & -\frac{k_y}{m} \\ 1 & 0 & 0 & 0 \\ 0 & 1 & 0 & 0 \end{bmatrix} \begin{bmatrix} P_x \dot{x} \\ P_y \dot{y} \\ P_x x \\ P_y y \end{bmatrix} + \quad (1)$$

$$\begin{bmatrix} B_{11} = \frac{P_x S_x}{m} & B_{12} = \frac{\beta P_x S_y}{m} \\ B_{21} = \frac{\alpha P_y S_x}{m} & B_{22} = \frac{P_y S_y}{m} \\ 0 & 0 \\ 0 & 0 \end{bmatrix} \begin{bmatrix} V_{fx} \\ V_{fy} \end{bmatrix}$$

-continued $$\begin{bmatrix} V_x \\ V_y \end{bmatrix} = \begin{bmatrix} 0 & 0 & 1 & 0 \\ 0 & 0 & \gamma\frac{P_y}{P_x} & 1 \end{bmatrix} \begin{bmatrix} P_x\dot{x} \\ P_y\dot{y} \\ P_x x \\ P_y y \end{bmatrix} + \begin{bmatrix} \varepsilon_{xx} & \varepsilon_{xy} \\ \varepsilon_{yx} & \varepsilon_{yy} \end{bmatrix} \begin{bmatrix} V_{fx} \\ V_{fy} \end{bmatrix} \quad (2)$$

In Equations (1) and (2):
m=modal mass
x, y=drive and sense axes displacements;
$b_x$, $b_y$=damping coefficients along x and y displacements, respectively;
$k_x$, $k_y$=stiffness along x and y displacements, respectively (those skilled in the art will appreciate that in addition to the linear term shown, the stiffness contains a quadratic with amplitude);
$b_{xy}$=damping cross-coupling;
$b_{xy1}$, $b_{xy2}$=cross damping terms determined by the estimator (as discussed further below), and given by Equations (3) and (4) below;
$k_{xy}$=stiffness cross-coupling, the quadrature term;
$k_{xy1}$, $k_{xy2}$=cross stiffness terms determined by the estimator (as discussed further below), and given by Equations (5) and (6) below;
α=coupling (misalignment) of x force into y axis;
β=coupling (misalignment) of y force into x axis (the forcer misalignments are defined such that positive values indicate the forcers toe in toward one another);
ε=feed forward, direct coupling terms (mainly stray capacitance);
γ=misalignment of y pick off (the x pick off defines the instrument coordinate frame);
$V_x$, $V_y$=voltage (or other signal) indicating proof mass positions;
$V_{fx}$, $V_{fy}$=voltage (or other signal) indicating drive force; and
$P_x$, $P_y$=pick off constants (in MKS units V/m)

$$b_{xy1} = \left(\frac{b_{xy} + 2m_c\Omega + \frac{\varphi k_{xy}}{\omega_n}}{m}\right)\left(\frac{P_x}{P_y}\right) \quad (3)$$

$$b_{xy2} = \left(\frac{b_{xy} - 2m_c\Omega + \frac{\varphi k_{xy}}{\omega_n}}{m}\right)\left(\frac{P_y}{P_x}\right) \quad (4)$$

$$k_{xy1} = \left(\frac{k_{xy} - \varphi\omega_n(b_{xy} + 2m_c\Omega)}{m}\right)\left(\frac{P_x}{P_y}\right) \quad (5)$$

$$k_{xy2} = \left(\frac{k_{xy} + \varphi\omega_n(b_{xy} - 2m_c\Omega)}{m}\right)\left(\frac{P_x}{P_y}\right) \quad (6)$$

In Equations (3)-(6):
mc=Coriolis mass, which differs from the mass because of the modal slip factor;
Ω=case angular rate;
φ=the relative phase pick-off (angular difference between $P_x$ and $P_y$); and
ωn=nominal resonant angular frequency.
In the above Equations, the small-angle approximation is used for sine φ and cosine φ. Equations (1)-(6) are written for an electrostatically driven and sensed gyroscope. As will be appreciated by those skilled in the art, similar equations may be written for other mechanizations such as ring gyroscopes driven and sensed by D'Arsonval magnetic devices.

In Equations (1) and (2), the terms have been grouped to emphasize terms that are addressed in the parameter estimator discussed below. Equation (1) represents two second order resonators coupled lightly by cross stiffness (quadrature), cross damping (bias), and the desired angular rate. In normal operation, the x axis is the self-oscillator (also called the drive or primary axis) while the y axis (also called the sense or secondary axis) is run closed-loop with high bandwidth (e.g., about 100 Hz). The self oscillator is important because it keeps the electrical reference signal (used for demodulation and remodulation) phase locked with the mechanical resonance.

In one example of a MEMS-based ring gyroscope having a quality factor of 30,000, the resonance peak −3 dB width (corresponding to a 45° phase shift) is 0.2 Hz, while stiffness variation causes the resonant frequency to change −27 ppm/° C. or −0.4 Hz/° C. For such an example, obtaining good bias stability may require control of phase shifts on the order of 10 microradians (µrad), which implies impossible thermal control. Accordingly, it is preferable that the gyroscope operation avoids sensitivity to operating about the resonant peak. In other words, terms of the form $(ms^2+bs+k)$ should be avoided. In the case of a ring gyroscope where drive and sense frequencies are very close to one another, small changes in stiffness or resonant frequency results in large phase errors, which cause large gyroscope errors.

According to one embodiment, to avoid $(ms^2+bs+k)$ terms, feed forward errors are removed from the position signal, rather than from the force rebalance. For the sense axis, the force rebalance is generated from the corrected position signal. Therefore, the drive force is given by:

$$V_{fx} = H(s)(V_y - V_{fx}\epsilon_{yx} - V_{fy}\epsilon_{yy}) \quad (7)$$

In Equation (7), s is the Laplace transform of d/dt, and H(s) is the feedback transfer function. H(s) may be implemented by demodulation, compensation, and remodulation.

With a tight secondary feedback loop ($V_y$=0) and small angle approximations for φ, the DC voltage to rebalance the sense axis (the principal gyroscope output) is given by:

$$V_{fy\text{-}BB} = LP(t) \otimes \frac{\sin\omega_0 t}{B_{22}}\Big\{-B_{21}V_{fx} + \quad (8)$$
$$\frac{V_x}{P}\Big[\frac{k_{xy} + (b_{xy} - 2m_c\Omega)\omega_0\varphi}{m} + \frac{i\omega_0(b_{xy} - k_{xy}\varphi)}{m} - \frac{i2m_c}{m}\Omega\Big]\Big\}$$

In Equation (8):
$P=|P_x/P_y|$=ratio of pick off magnitudes;
$i=\sqrt{-1}$;
φ=phase difference ($\phi_x-\phi_y$) between oscillator (x) and sense (y) pick off electronics;
$\omega_0$=oscillator frequency;
t=time;
LP(t)=low pass filter to remove $2\omega_0$ and higher frequency terms; and
⊗=convolution operator.
Terms in Equation (8) can be grouped to represent the bias 120 and scale factor 130 shown in FIG. 1. In one example, the drive (x) axis position signal (pick off signal), $V_x$, and the x axis drive or forcing signal, $V_{fx}$, are AC signals near the oscillator frequency. In a preferred embodiment, the drive axis position is used as the reference signal, and is given by $\cos(\omega_0 t)$, and the desired velocity signal is equal to $\sin(\omega_0 t)$. To obtain the desired base band rate signal, these signals may be multiplied by $\sin(\omega_0 t)$ because the operator i in Equation (8) represents a 90 degree phase shift.

For usual operation of the gyroscope, the drive axis (x for example) is driven in a self oscillator loop which is described by the following. The transfer function (output divided by input, for the linear case) for the $V_x$ pick off versus the $V_{fx}$ drive may be obtained From Equation (1). In most examples, it may be desirable to operate at the mechanical resonance where the phase shift is $-\pi/2$. Accordingly, a feedback amplifier and gain control loop may be implemented to add an additional $-\pi/2$ phase and to maintain the x amplitude. Mathematically, the resonant frequency may be determined by:

$$\angle \frac{V_x}{V_{fx}} = -\frac{\pi}{2} + d\varphi_{osc} \qquad (9)$$

In Equation (9), $d\varphi_{osc}$=additional phase. This is determined by the estimator, as discussed further below. Although in an ideal case, the phase shift of the control loop will be precisely $-\pi/2$, in reality there are phase errors from the amplifiers, etc. and this $d\varphi_{osc}$ captures those errors.

Unlike many other sensors (e.g., pendulous accelerometers), for the gyroscope, determining the bias and scale factor does not require absolute knowledge of the proof mass (ring) positions. Rather, only the x/y ratio (magnitude and phase) is used. As will be appreciated by those skilled in the art, the feed forward terms (E) and the forcing terms with misalignment (B) are complex quantities because of phase shifts in the electronics. According to certain embodiments, the estimator only excites the gyroscope near its resonant frequency in order to avoid exciting adjacent eigenmodes. Accordingly, the estimator may combine pick off misalignment $\gamma$ with forcer misalignments $\alpha$ and $\beta$, and as a result, it may not be possible to determine $\gamma$ independently. However, as demonstrated below, the angular rate calculation may be performed successfully using combined pick off and forcer angles. Independent knowledge of the forcer angles $\alpha$ and $\beta$ and the pick off angle $\gamma$ is not required. Additionally, in certain embodiments, due to the limited range of exciting frequencies, the estimator may not detect the relative phase of the pick off signals. Where this term may be important, it may be estimated by other methods, as discussed further below.

Figure 4:
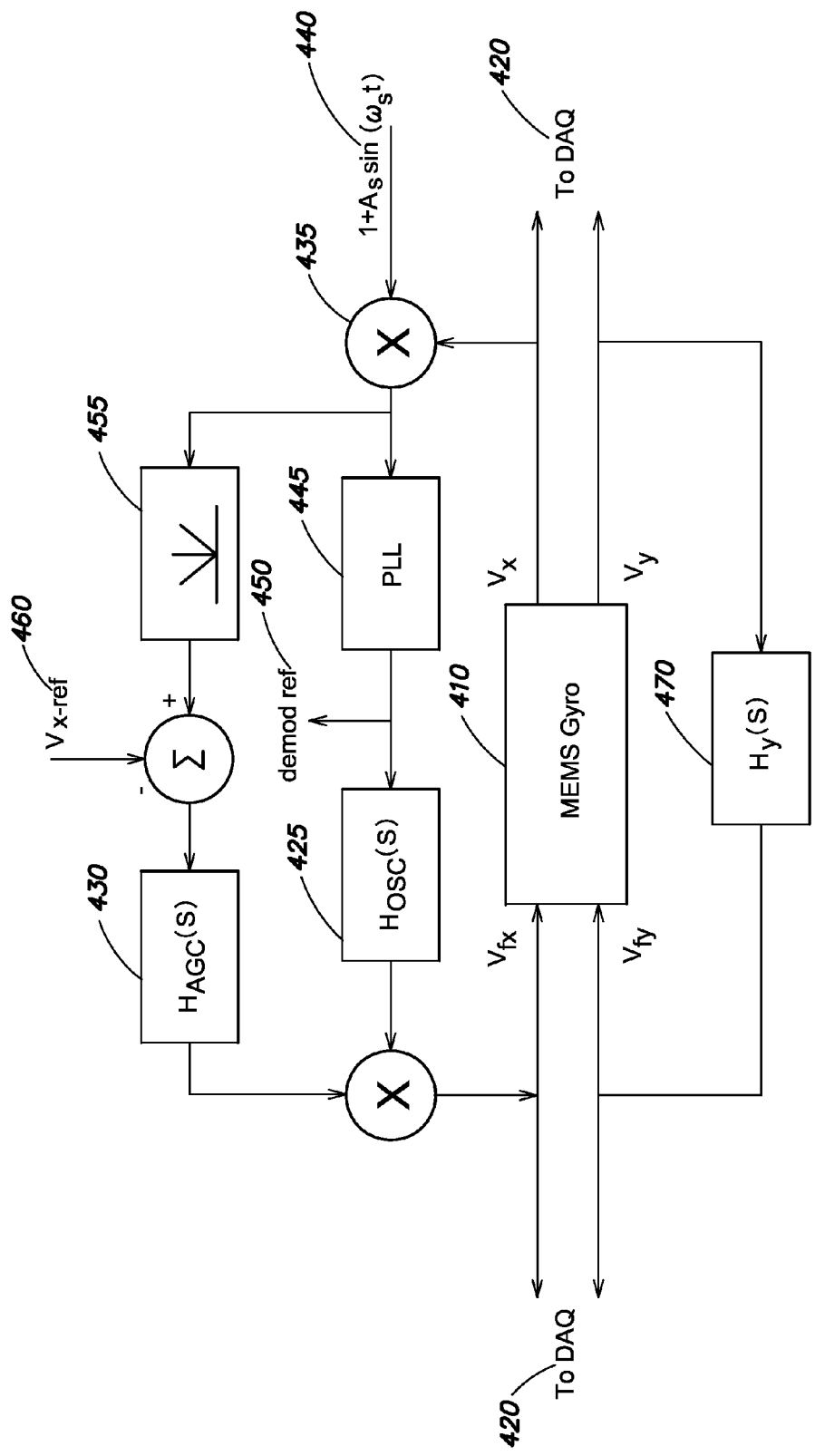
FIG. 4 is a block diagram of one example of a vibrating gyroscope under normal operation with the addition of side band amplitude modulation (on the drive signal), according to aspects of the present invention.

FIG. 4 is a block diagram of one example of a vibrating gyroscope under normal operation with the addition of side band amplitude modulation (on the drive signal). The gyroscope system includes a mechanical gyroscope sensor 410, which in some examples is a MEMS gyroscope. The gyroscope sensor 410 and associated electronic circuitry are coupled to a digital acquisition system 420. The gyroscope sensor 410 has two sets of forcing electrodes (corresponding to the primary and secondary axes) that are driven by $V_{fx}$ and $V_{fy}$, and two sets of pick off electrodes and amplifiers whose outputs are indicated by $V_x$ and $V_y$. The parameters $V_{fx}$, $V_{fy}$, $V_x$, and $V_y$ are communicated from the mechanical sensor 410 to the digital acquisition system (DAQ) 420, as shown in FIG. 4. In the illustrated example, the gyroscope primary axis (x) includes a self oscillator loop with amplitude control. Block 425 represents the self-oscillation function. Block 430 represents an automatic gain controller. The output $V_x$ is multiplied (represented by operator block 435) with signal 440, and fed into the self-oscillator 425 and automatic gain controller 430, which together comprise the primary axis loop, and then returned into the sensor 410 as $V_{fx}$. In the self-oscillation loop, the signal is phase modulated (represented by phase-locked loop block 445). A phase reference 450 is supplied to the DAQ 420. In the automatic gain control loop, the signal is conditioned (squared or absolute value as represented by function block 455) then summed with a reference signal 460 (represented by operator block 465) and fed to the automatic gain controller 430.

Still referring again to FIG. 4, the y axis loop is a force rebalance, represented by block 470, which is executed by in-phase and quadrature demodulation and remodulation (not shown in FIG. 4).

As discussed above, the feed forward terms ($\epsilon$) may be removed from the pick offs, $V_x$ and $V_y$, rather than from the force rebalance. By operating the primary axis in a self-resonant oscillator loop, by closing loop secondary and by adding side bands and demodulation, any effects of stiffness changes ($k_x$, $k_y$, linear and cubic softening) are eliminated from the read out equations (3) and (4). Accordingly, the necessary parameters in equations (3) and (4) can be estimated, even with variation in the stiffnesses, by amplitude modulating the self drive torque signal $V_{fx}$.

The parameter estimation and calculation of angular rate during missions may be done by software (referred to herein as the estimator or estimator algorithms/processes) operating on the data that is extracted by the digital acquisition system (DAQ), in particular on measurements of $V_x$, $V_y$, $V_{fx}$ and $V_{fy}$. As a result, the estimator may be largely insensitive to the exact implementation of the force rebalance loops. Thus, in one example, the forcing signals $V_{fx}$ and $V_{fy}$ from the sensor 410 are provided to the DAQ 420 for processing by the estimator, undergo filtering, modulation, and optionally gain control, and are returned as estimates of $V_x$ and $V_y$, respectively, as the oscillator drive and secondary force displacements as discussed below in Equations (11) through (19). Additionally, drive signals may be conditioned to eliminate feed forward leakages signals represented by $\epsilon_{xx}$ etc.

Figure 5:
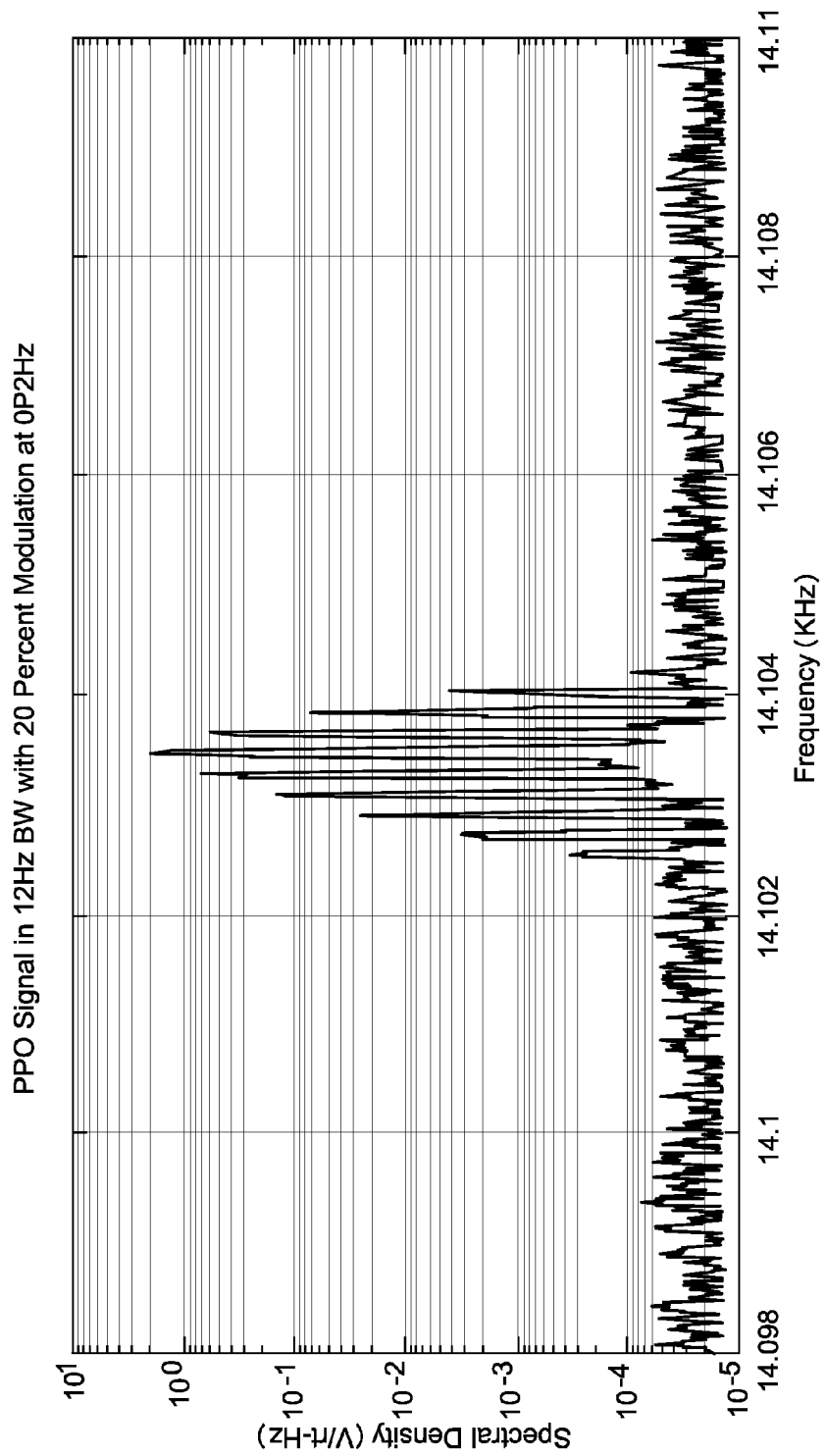
FIG. 5 is a graph illustrated one example of a position signal with multiple side bands.

According to certain embodiments, the position signal, $V_x$, rather than the force signal, $V_{fx}$, is modulated because the amplitude control and regeneration suppress the effect of the additional forces. Even when only a single side band is applied through modulation, the closed loop results in many side bands, as shown, for example, in FIG. 5. In certain examples, because of their large amplitude, only the first sidebands are used. Because the drive axis is operated in closed-loop (self oscillation), modulating the pick-off signals results in modulation of the drive signals. FIG. 4 shows modulation of the oscillator pick off signal $V_x$. FIG. 5 shows the resulting modulation of the oscillator forcing signal $V_{fx}$.

Figure 6:
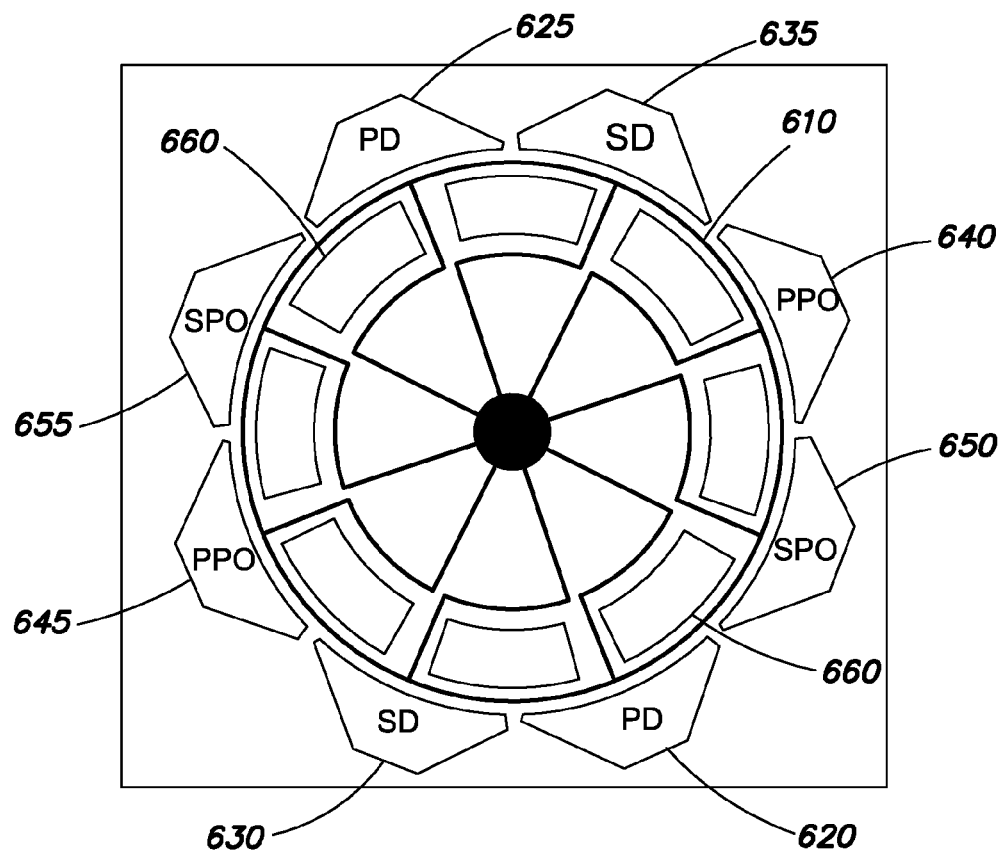
FIG. 6 is an illustration of one example of a ring gyroscope in which aspects and embodiments of the calibration techniques discussed herein may be applied.

FIG. 6 is a diagram illustrating one example of a ring gyroscope corresponding to the block diagram of FIG. 4. The ring and supporting spokes are shown as heavy black lines 610 in the diagram. In this example, the inner electrodes 660 are used for trimming quadrature (cross-stiffness) and making stiffness $k_x$ and $k_y$ equal, while the outer electrodes are used for drive and pick off. Thus, electrodes 620 and 625 may be used for the primary drive, electrodes 630 and 635 may be used for the secondary drive, electrodes 640 and 645 may be used for the primary pick-off, and electrodes 650 and 655 may be used for the secondary pick-off. The x and y axes (primary and secondary) may be separated by 45 spatial degrees. The pick offs are excited by and the forcers biased by voltage applied directly to the ring.

According to one embodiment, from Equation (1) above, separating the damping cross coupling $b_{xy}$ from earth rate may be achieved by interchanging the roles of the x and y axes during calibration. Instead of the oscillator being x (as shown in FIG. 4), the y axis becomes the oscillator and the x axis is force rebalanced. This interchange may be accomplished by a set of switches provided on a switching circuit board coupled to the gyroscope.

Figure 7:
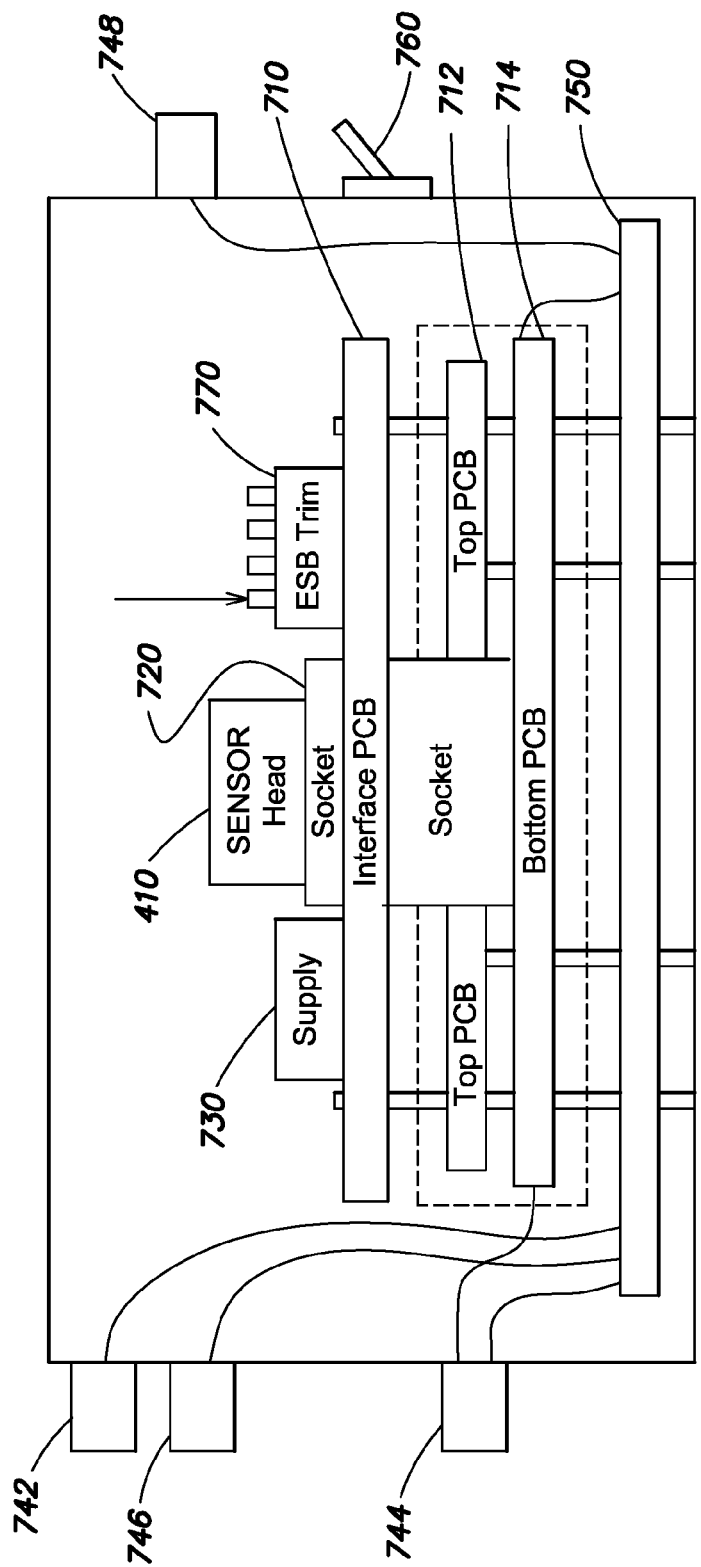
FIG. 7 is a diagram of one example of a hardware implementation of a gyroscope system according to aspects of the present invention.

FIG. 7 is a diagram of one example of a hardware implementation of an example of a gyroscope system corresponding to the block diagram of FIG. 4. The system includes the sensor 410, and typical oscillator and feedback electronics provided on printed circuit boards 710, 712, and 714. The sensor 410 may be mounted in a socket 720 connected to the printed circuit boards 710, 712, 714. The system further includes a power supply 730. Modulation inputs may be provided via connectors 742 and 744. The primary drive and secondary drive inputs may be provided via connector 746. The primary and secondary pick-offs, along with phase outputs, etc., may be supplied via connector 748. The connectors 746 and 748 may be used to couple the sensor 410 and associated electronics to the DAQ 420. As discussed above, the system further includes a switching board 750 that includes sets of switches to reverse the x and y electrical connections so as to achieve separation of the damping cross coupling bxy from the earth rate during calibration. A switch 760 may be used to activate and deactivate the automatic gain control loop (shown in FIG. 4).

In doing self-calibration, an important assumption is that the ratio of Coriolis mass (mc) over modal mass (m) is constant after factory calibration. This ratio is also called the Bryant factor. Typically, it is expected that the Bryant factor remains constant since it depends primarily on mass and not stiffness. According to certain embodiments, the estimator may be used to determine all mechanical and electrical parameters necessary to determine the gyroscope's bias and scale factor, as discussed above. Table 1 below list the 23 parameters to be estimated according to one embodiment.

TABLE 1

| Description | Symbol | Number | Where Determined |
|---|---|---|---|
| Forcer feed forward to pick-off | $\epsilon_{xx}, \epsilon_{xy},$ $\epsilon_{yx}, \epsilon_{yy}$ | 8 (complex parameters) | Feed forward tests |
| Forcer terms (off-diagonal terms include forcer misalignment) | $B_{11}, B_{12},$ $B_{21}, B_{22}$ | 8 (complex parameters) | Estimator |
| Damping and cross damping | $b_x/m, b_y/m,$ $b_{xy1}, b_{xy2}$ | 4 | Estimator |
| Cross stiffness | $k_{xy1}, k_{xy2}$ | 2 | Estimator |
| Oscillator phase difference from $-\pi/2$ | $d\phi_{osc}$ | 1 | Estimator |
| Magnitude of pick-off ratio | $|p_x/P_y|$ | 1 | Estimator post-processing or pick off test |
| Phase of pick-off ratio | $\phi$ | 1 | Pick off test |

According to one embodiment, using a rate table, the gyroscope and sensor are calibrated at the factory to determine the Bryant factor, sensor mounting plate misalignment, and other errors such as nonlinearities in scale factor. With known input rate, the estimator may determine the Bryant factor. It is assumed that changes in Bryant factor, out-of-plane misalignments, and the other errors are small and will remain at acceptable levels over the system life and mission. Periodically or before a mission, the estimator may calibrate the gyroscope bias and scale factor without rotating the system, a necessity for strap down and inertial stabilized systems. The estimator may remove earth rate from the estimated gyroscope bias, as discussed above. After calibration, the gyroscope is limited by its in-run stability, which usually requires thermal control. For example, if the scale factor changes by 100 ppm/° C., then thermal control of 0.1° C. is required for 10 ppm scale factor stability.

Figure 8:
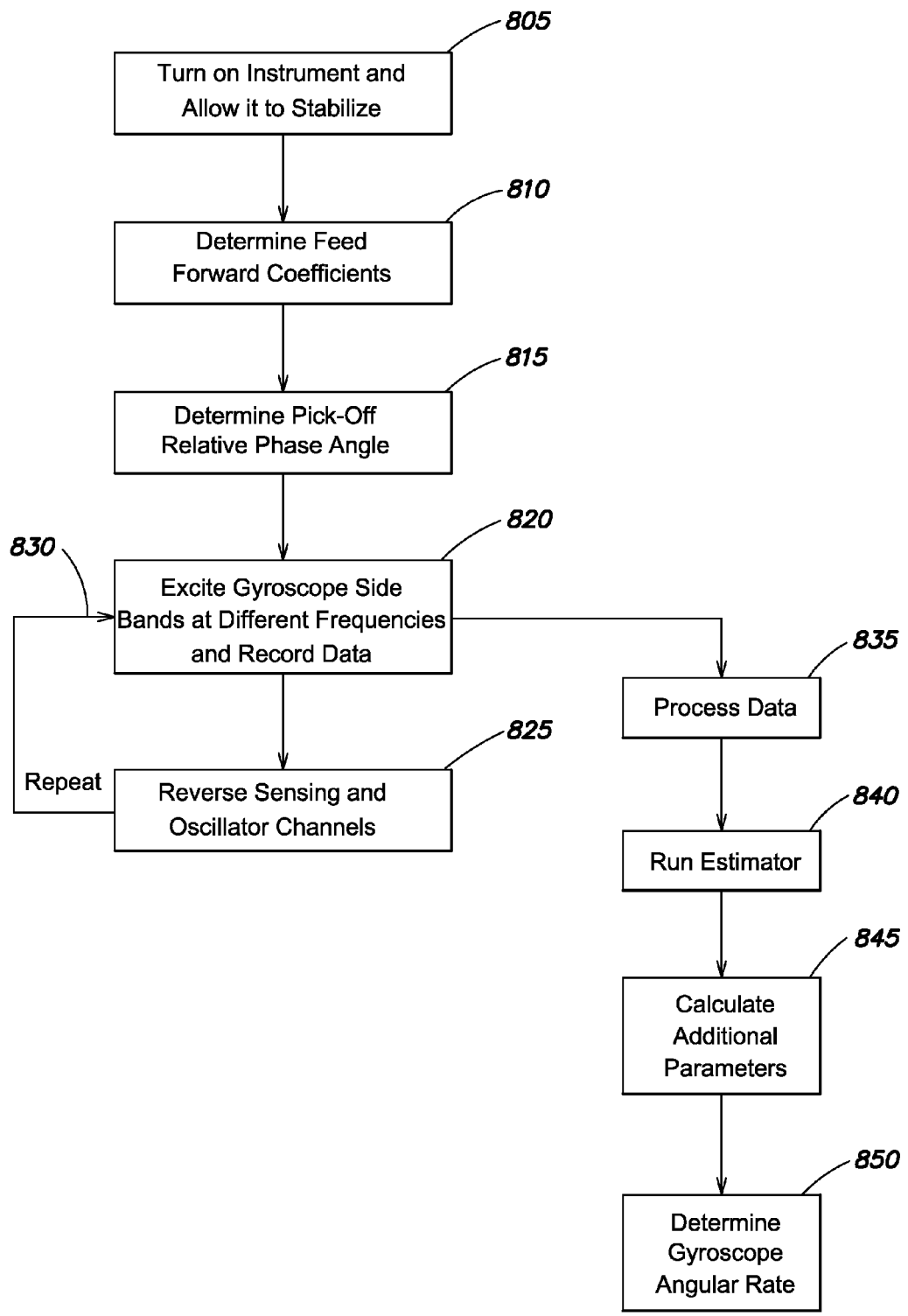
FIG. 8 is a flow diagram of one example of a calibration process according to aspects of the present invention.

Referring to FIG. 8, there is illustrated a flow diagram of one example of an individual calibration sequence that may be performed on a gyroscope using the estimator discussed herein.

The sequence may begin at step 805, which includes turning on the instrument and allowing it to stabilize. The calibration process may remove long term drift. Thereafter, the gyroscope sensor 410 operates at the level of its in-run stability, as discussed above.

At step 810, the feed forward coefficients are determined. According to one embodiment, in step 810 with the oscillator and feedback loops turned off, voltages are applied to the gyroscope, the applied frequencies differing slightly from the resonant frequencies. The feed forward terms may be measured directly. In another example, one or more potentiometers (e.g., element 770 in FIG. 7) may be used to adjust the feed through terms to zero. The success of the trim may be determined from the residuals of the transfer function fits.

At step 815, the pick-off relative phase angle may be determined. In one example wherein the calibration process is applied to a ring gyroscope, this parameter is determined by exciting the gyroscope ring with frequency slightly off the resonant frequency (little ring motion off resonance). Assuming the x and y air gaps in the ring gyroscope are identical, the relative magnitudes and phases may also be determined. In another example, pick-off relative phase angle may be determined by driving the ring to large amplitudes and comparing side lobes to the principal excitation peak, a technique known as Trusov-Shkel.

In one example, the gyroscope is configured with the x axis as the oscillator and the y axis as the closed loop sensing channel. In this configuration, at step 820, the gyroscope side bands are excited at different frequencies. In one example, for a gyroscope having a resonant half peak width of 0.25 Hz, the side bands may be excited at 15 frequencies, equally spaced between 0.1 and 1.5 Hz. Step 820 further includes recording the input frequencies, the drive ($V_{fx}, V_{fy}$) and ($V_x, V_y$) pick off voltages, and the phase reference voltage, all as a function of time. The frequency of the applied side band is also recorded.

Step 825 includes reversing the sensing and oscillator channels, and repeating the side band excitation of step 820 (indicated by arrow 830).

In one embodiment, step 835 includes processing obtained data into a table for use by the estimator. The data may include a series of voltages representing the two drive and two pick off signals, and the phase reference (which is derived from the drive pick off) versus time, along with a recorded oscillation frequency. In one example, this data may be sampled at high frequency (i.e., taking many data samples per measurement cycle). Alternatively, in another example, the data may be demodulated or down-mixed into analog and sampled at a lower rate. In certain examples, the position signal, from which the phase reference is derived, may have extra side bands, as shown in FIG. 5, which could affect demodulation. From the carrier, a digital phase locked loop (PLL) may be used to remove higher harmonics and amplitude modulation. The PLL frequency follows oscillator frequency modulation caused by both the stiffness variations with temperature or drive amplitude so that demodulation yields the desired side band transfer functions independent of oscillator frequency. The individual signals are multiplied by the reference signal and by its quadrature signal, and low-passed to obtain the signals versus the base band frequency. Each output signal may be divided into complex numbers in phase with the reference and in quadrature with the reference. As discussed above, the phase relationships may be controlled to match those of the estimator. In addition to determining the drive and pick signals at sideband frequencies, the transfer function between the drives and pick-offs may be calculated.

Step 840 may include running the estimator to determine the first 15 parameters listed in Table 1 above. Examples of the estimator algorithms which may be used in step 840 are discussed further below. The estimator algorithms may use either the side band transfer functions or the side band drive and pick-off voltages, as discussed in more detail below.

Step 845 may include using the relative phase angle measured in step 815 and the parameter estimates obtained in step 840 to calculate the relative pick-off magnitude $|p_x/p_y|$, the cross damping $b_{xy}$, the cross stiffness $k_{xy}$, and the input angular rate based on $b_{xy1}$, $b_{xy2}$, $k_{xy1}$, and $k_{xy2}$ from Equation (4).

After the calibration procedure is complete, during normal operation of the gyroscope, a step 850 may include using the obtained parameters and terms to determine the angular rate of the gyroscope during a mission based on Equations (3), (4), (7) and (8).

As discussed above, in certain examples, the estimator algorithms may use the side band transfer functions. For the case where the primary pick-off is x and the secondary pick-off is y, these transfer functions may be defined as follows.

For the following mathematical derivation, consider the nominal oscillator drive as $\sin(\omega_0 t)$, which is generated by the normal self-oscillator loop (as discussed above). Those skilled in the art will appreciate, given the benefit of this disclose, that the physical modulation is applied to the position pick off, $V_x$, as shown in FIG. 4. The nominal drive function is modulated so that the drive function is given by:

$$V_{fx} = \sin \omega_0 t [1 + m \sin \omega_{sb} t] = \sin \omega_0 t \cdot V_{fsb}(t) \quad (10)$$

In Equation (10), m is the modulation index, which typically may be in a range of approximately 2-20%. The drive signal passes through the sensor 410 (see FIGS. 4 and 5) whose transfer function is G(s). The output signal is demodulated by multiplying by 2 $\sin(\omega_0 t)$, and filtering the higher frequency terms to obtain the demodulated output $V_{sb}(t)$. The side band transfer function for sine demodulation is given by:

$$G_{sin}(s) = \frac{V_{sb}(s)}{V_{fsb}(s)} = \frac{1}{2}[G(i\omega_0 + s) + G(i\omega_0 - s)^*] \quad (11)$$

where s=Laplace transform of d/dt;
Similarly, if demodulating by $-2 \cos(\omega_0 t)$, the base band transfer function is given by:

$$G_{cos}(s) = \frac{i}{2}[G(i\omega_0 + s) - G(i\omega_0 - s)^*] \quad (12)$$

In Equations (11) and (12) the * operator indicates the complex conjugate. Equations (11) and (12) are valid for any combinations of drive and pick offs; that is $V_{fx}$ or $V_{fy}$ to $V_x$ or $V_y$.

As discussed above, in practical implementation when the secondary axis is run in closed loop, there may be several side band signals on the x and y drive signals, as shown in FIG. 6, for example. In one embodiment, all signals are referenced to the phase reference (line 618 in the example of FIG. 5), which is nominally the oscillator position or velocity. As discussed above, from the carrier, a digital phase locked loop (PLL) removes higher harmonics and amplitude modulation. The PLL frequency follows oscillator frequency modulation caused by both the stiffness variations with temperature or drive amplitude so that demodulation yields the desired side band transfer functions independent of oscillator frequency. In processing the signals to base band, maintaining phase and amplitude fidelity is crucial. Accordingly, after multiplication to base band all signals are filtered by the same digital filters. The amplitude and phase (real and imaginary parts) may be extracted by least squares. Since the side band frequency is well known and recorded (step 920), linear least squares may be applied to make the processing time very rapid.

According to another embodiment, the gyroscope system may be operated and calibrated with an open loop secondary. The drive signals might contain both sine and cosine terms. In this case, the following relationships exist between the baseband drives and pick-offs:

$$PPO_{sin} = G_{xx,sin} PD_{sin} + G_{xx,cos} PD_{cos} \quad (13)$$

$$PPO_{cos} = G_{xx,cos} PD_{sin} - G_{xx,sin} PD_{cos} \quad (14)$$

In Equations (13) and (14), $PD_{sin}$ is the primary drive demodulated by 2 times the phase reference, and $PD_{cos}$ is the primary drive demodulated by $-2$ times the quadrature reference. $G_{xx,sin}$ is the primary drive to primary pick-off baseband transfer function demodulated by the phase reference. In this case, the phase reference is defined as $\sin(\omega_0 t)$.

Equations (13) and (14) assume no input on the secondary axis. In other words, the implicit assumption is that the only contribution to the primary pick-off is from the primary drive via the $G_{xx}$ sensor transfer function. This being a linear problem, the effects of additional coupling from the $G_{yx}$ transfer function are superimposed. That is, the response on the primary pick-off when both the primary drive and the secondary drive are excited is the sum of the responses $G_{xx}$ PD+$G_{yx}$ SD. Additionally, the sine and cosine demodulation is agnostic to the axes in question, and therefore the same relationships apply to the $G_{yx}$ transfer function. Accordingly, the response on the primary axis may be expressed as:

$$PPO_{sin} = G_{xx,sin} PD_{sin} + G_{xx,cos} PD_{cos} + G_{yx,sin} SD_{sin} G_{yx,cos} SD_{cos} \quad (15)$$

$$PPO_{cos} = G_{xx,cos} PD_{sin} - G_{xx,sin} PD_{cos} + G_{yx,cos} SD_{sin} - G_{yx,sin} SD_{cos} \quad (16)$$

When the gyroscope is operated with the primary loop connected to the primary oscillator drive and secondary closed loop, values are obtained for [$PPO_{sin}$, $PPO_{cos}$, $PD_{sin}$, $PD_{cos}$, $SD_{sin}$, and $SD_{cos}$]. There are four unknowns in the problem stated by Equations (15) and (16), namely, $G_{xx,cos}$, $G_{xx,sin}$, $G_{yx,cos}$, and $G_{yx,sin}$. Accordingly, two additional equations are needed, along with an additional set of measurements. These may be obtained by inverting the drive (using the primary as the force rebalance loop), as discussed above. This process provides a new set of values [$PPO_{sin}$, $PPO_{cos}$, $PD_{sin}$, $PD_{cos}$, $SD_{sin}$, $SD_{cos}$] which must also satisfy Equations (15) and (16). Thus, there are four equations to solve for the four unknowns. This can be written out in matrix form to provide Equation (17):

$$\begin{bmatrix} PPO_{sin,normal} \\ PPO_{cos,normal} \\ PPO_{sin,inverted} = 0 \\ PPO_{cos,inverted} = 0 \end{bmatrix} = \quad (17)$$

$$\begin{bmatrix} PD_{sin,normal} & PD_{cos,normal} & SD_{sin,normal} & SD_{cos,normal} \\ -PD_{cos,normal} & PD_{sin,normal} & -SD_{cos,normal} & SD_{sin,normal} \\ PD_{sin,inverted} & PD_{cos,inverted} & SD_{sin,inverted} & SD_{cos,inverted} \\ -PD_{cos,inverted} & PD_{sin,inverted} & -SD_{cos,inverted} & SD_{sin,inverted} \end{bmatrix}$$

$$\begin{bmatrix} G_{xx,sin} \\ G_{xx,cos} \\ G_{yx,sin} \\ G_{yx,cos} \end{bmatrix}$$

Inverting the matrix of Equation (17) provides the values of the four transfer functions.

During each run of the gyroscope, data may also be obtained from the secondary pick-off, and the same equations apply by changing the transfer function subscripts appropriately (since the sin/cos demodulation is axis agnostic):

$$\begin{bmatrix} SPO_{sin,normal} = 0 \\ SPO_{cos,normal} = 0 \\ SPO_{sin,inverted} \\ SPO_{cos,inverted} \end{bmatrix} = \quad (18)$$

$$\begin{bmatrix} PD_{sin,normal} & PD_{cos,normal} & SD_{sin,normal} & SD_{cos,normal} \\ -PD_{cos,normal} & PD_{sin,normal} & -SD_{cos,normal} & SD_{sin,normal} \\ PD_{sin,inverted} & PD_{cos,inverted} & SD_{sin,inverted} & SD_{cos,inverted} \\ -PD_{cos,inverted} & PD_{sin,inverted} & -SD_{cos,inverted} & SD_{sin,inverted} \end{bmatrix}$$

$$\begin{bmatrix} G_{xy,sin} \\ G_{xy,cos} \\ G_{yy,sin} \\ G_{yy,cos} \end{bmatrix}$$

Equation (18) above provides the other four transfer functions.

According to one embodiment, the estimator minimizes a quadratic function that includes the squares of differences between measured and calculated positions (or measured and calculated transfer functions). For position data, the estimator cost function is given by Equation (19):

$$J = \Sigma_{i=1}^{2nf}[(PD_{sin,e}-PD_{sin,m})^2+(PD_{cos,e}-PD_{cos,m})^2+ (SD_{sin,e}-SD_{sin,m})^2(SD_{cos,e}-SD_{cos,m})^2] \quad (19)$$

In Equation (19), of is the number of frequencies used to obtain the sideband data (as discussed above), subscript "e" indicates an estimated parameter based on assumed coefficients, and subscript "m" indicates measured data. To control the fit and emphasize desired terms, the individual terms can be weighted. The estimation is done in the frequency domain, rather than the time domain, for greatly reduced execution time. The estimation may also be done in the time domain by sweeping the input voltages over a range of frequencies. For the time domain version, there are no discrete frequencies to sum over, and the sum must be over all time instants in the data set (which is part of the reason why computation time is so vast for the time domain).

In one embodiment, the estimator algorithm uses an initial guess for the parameters listed in Table 1. Rough estimates for the damping constant ($b_x/m$, $b_y/m$) and the forcer parameters ($B_{11}$, $B_{22}$) with the other parameters assumed to be zero are sufficient for convergence. The estimator then calculates the normal transfer functions from these parameters and from the measured drive voltages, according to Equation (2). The estimator algorithm may then proceed to calculate the base band transfer functions from Equations (13) and (14), and then calculate the estimated position signals using Equations (15)-(19). Well established minimizing algorithms may be used to iteratively adjust the parameters to minimize the function J in Equation (19). After the data has converged, effects of relative pick-off phase shifts (ϕ) are removed to determine the physical cross damping ($b_{xy}/m$) and cross stiffness ($k_{xy}/m$) terms, and to estimate the angular rate.

Thus, aspects and embodiments provide a self-calibration process that does not depend on the absolute value of a pick-off or forcer constant and the associated electrical gains. Rather, only the ratio magnitude and phase of the pick-off constant is required. In most examples processing is done in the frequency domain to reduce computation time. Frequencies may be swept over only a small range to avoid coupling into other modes. By operating the oscillator at resonance, by demodulating with the oscillation signal, and by running the secondary closed loop, sensitivity to the stiffness terms kx and ky and their sensitivity to ring displacement (nonlinearity) is eliminated and need not be estimated. As discussed above, the estimator may determine the relative magnitude of the pick-off |Px/Py|; however, it may not be possible to estimate the relative angle between the pick-offs for a small frequency sweep. Accordingly, the relative angle may be determined by exciting the gyro ring with an AC signal (rather than the forcers) with a frequency that is slightly off the resonant frequency. The relative angle may then be used to determine the angular rate of the gyroscope (see Equation (4)). Except for a weak dependence on the oscillator phase criterion, the estimator does not depend on the specifics of the feedback electronics in either the oscillator or the closed loop sense axis. Calibration and demodulation may be done digitally. When calibrating the gyroscope at the factory, the estimator may estimate the rate applied during calibration from the $b_{xy1}$ and $b_{xy2}$ terms of Equation (1). Because of small non-linear terms and other effects, this rate may differ from the actual angular rate (earth rate or table rate). Accordingly, an estimated fixed difference between the two rates may be applied to subsequent calibrations in the field.

As discussed above, certain embodiments use an amplitude controlled oscillator, add sidebands to the oscillating axis, and use closed loop secondary axis control. However, as will be appreciated by those skilled in the art, given the benefit of this disclosure, other embodiments may be implemented. For example, in certain embodiments calibration may be performed without the self oscillator. In this case, the drive frequency is swept without modulation to probe the gyroscope. This calibration may be very sensitive to variations in stiffness, particularly with high quality factor gyroscopes. The secondary axis may be operated in closed or open loop. According to another embodiment, the self oscillator may be run with modulation, leaving the secondary loop open. In this case, nonlinear stiffness terms may degrade performance of calibration. Alternatively, the self oscillator may be operated with closed secondary loop, with the modulation applied to the secondary output. In this configuration, nonlinear stiffness terms again may degrade calibration performance. In another embodiment, the position signal may be frequency modulated instead of amplitude modulated. This arrangement may provide a mechanism for handling nonlinear stiffness terms in the above-mentioned arrangements.

Aspects and embodiments provide a calibration system and method that allows for determining the gyroscope bias (better than earth rate) and scale factor without rotating the instrument. As discussed above, hardware associated with the gyroscope system may be provided to perform side band modulation and axis switching to eliminate the otherwise very large sensitivity to stiffness variation with motion amplitude, time, and temperature.

According to certain embodiments, the calibration process is approached by breaking the parameter estimation problem into steps of (a) removing the feed forward noise from the pick off signals; (b) applying the estimator to the side band modulated data; and (c) determining the relative phase shift of the pick offs (by varying the voltage applied to the gyroscope). As discussed above, the side bands may be added to the normal oscillator signals, and in particular, may be added to the oscillator pick-off, $V_x$, rather that at the forcing voltage, $V_{fx}$. Voltage versus time data may then be processed to obtain the side band transfer functions, as discussed above. Demodulation techniques may be used to account for the amplitude and phase side bands on the reference phase signal.

According to certain embodiments, the estimator may be augmented by applying Shkel-Trusov and other techniques, as discussed above, to determine the pick-off relative gain and phase, and optionally with the inclusion of thermal control to improve in-run stability. Improved knowledge of bias and scale factor is important for many commercial and military applications of gyroscope and inertial sensing systems. Aspects and embodiments of the calibration processes discussed herein may allow inexpensive receivers to be used in GPS-denied environments, such as urban canyons and anti-jamming in military applications, for example, and may provide improved inertial navigation sensors.

It has been noted that the spring forces could in some cases contain cubic terms; that is, the spring forces in the x and y direction could be described as:

$$F_x = -k_x x - k_{3x} x^3 \qquad (20)$$

$$F_y = -k_y y - k_{3y} y^3 \qquad (21)$$

While the linear auto stiffness terms are always positive, the cubic terms can be positive or negative representing spring stiffening or softening, respectively. It has been noted above that amplitude control in the oscillator loop, closed loop control in the secondary loop, and the side band demodulation remove the effects of the cubic stiffness.

Similarly, the cross stiffness terms may include cubic terms; that is, $$F_x = -k_{xy1} y - k_{3xy1} y^3 \qquad (22)$$

$$F_y = -k_{xy2} x - k_{3xy2} x^3 \qquad (23)$$

where $k_{3xy1}$ and $k_{3xy2}$ are cubic coefficients. Terms that include both x and y (for example xy) are neglected since with closed loop operation with either x or y would be very small. Unlike the auto stiffness terms, the cross stiffness nonlinearities require special handling in the estimator. From Equation (10), consider that the electrical force input to the oscillator is written as:

$$F_e = \text{Sin}[t\omega_c](1 + F_{sb}\text{Sin}(t\omega_{sb})) \qquad (24)$$

$$= \frac{1}{2}\text{Cos}[t(\omega_c - \omega_{sb})] - \frac{1}{2}\text{Cos}[t(\omega_c + \omega_{sb})] + \text{Sin}(t\omega_c)$$

Equation (24) suggests writing the position response as:

$$x = \text{Sin }[\phi_c + t\omega_c]m_c + \epsilon \text{ Cos }[\phi_l + t(\omega_c - \omega_{sb})]m_l - \epsilon \text{ Cos } [\phi_u + t(\omega_c + \omega_{sb})]m_u \qquad (25)$$

Where:
u, c, l=indicate upper, carrier, and lower frequencies, respectively;
m=magnitude (in distance units such as meters);
$\phi$=phase; and
$\epsilon$=small expansion variable.

With perfect feedback electronics, the carrier phase should be zero. Non-zero $\phi_c$ allows for phase shift in the oscillator electronics.

Cube x in Equation (25) and demodulate by 2 Sin [$\omega_c t$]. Retain the first order terms in the side bands at the modulation frequency $\omega_{sb}$. The approximate transfer function of $x^3/F_{sb}$ is:

$$\text{Gcub sine} = \frac{3}{4}G \sin(3 \text{ Cos }[\phi_c]^2 + \text{Sin }[\phi_c]^2)m_c^2 - \frac{3}{4}G \cos \text{ Sin } [2\phi_c]m_c^2 \qquad (26)$$

where G sin and G cos are defined in Equations (11) and (12).

Demodulating $x^3$ by $-2$ Cos [$\omega_c t$] results in additional terms which appear as sideband transfer functions.

$$\text{Gcub cos} = \frac{3}{4}G \cos(\text{Cos }[\phi_c]^2 + 3 \text{ Sin }[\phi_c]^2)m_c^2 - \frac{3}{4}G \sin \text{ Sin } [2\phi_c]m_c^2 \qquad (27)$$

While the cubic terms are linear in the side bands, they do depend on the carrier amplitude squared; therefore, several drive amplitudes must be included in the self calibration if cubic terms are to be estimated. If these terms are not included in the estimator, the estimator will attribute them to cross stiffness and cross-damping with ensuing poor calibration of important closed loop parameters (indicated in Equation (8)). Employing Equations (26) and (27, the cubic terms $k_{3xy1}$ and $k_{k3xy2}$ should be added to the estimator if the hardware indicates their inclusion.

Figure 9:
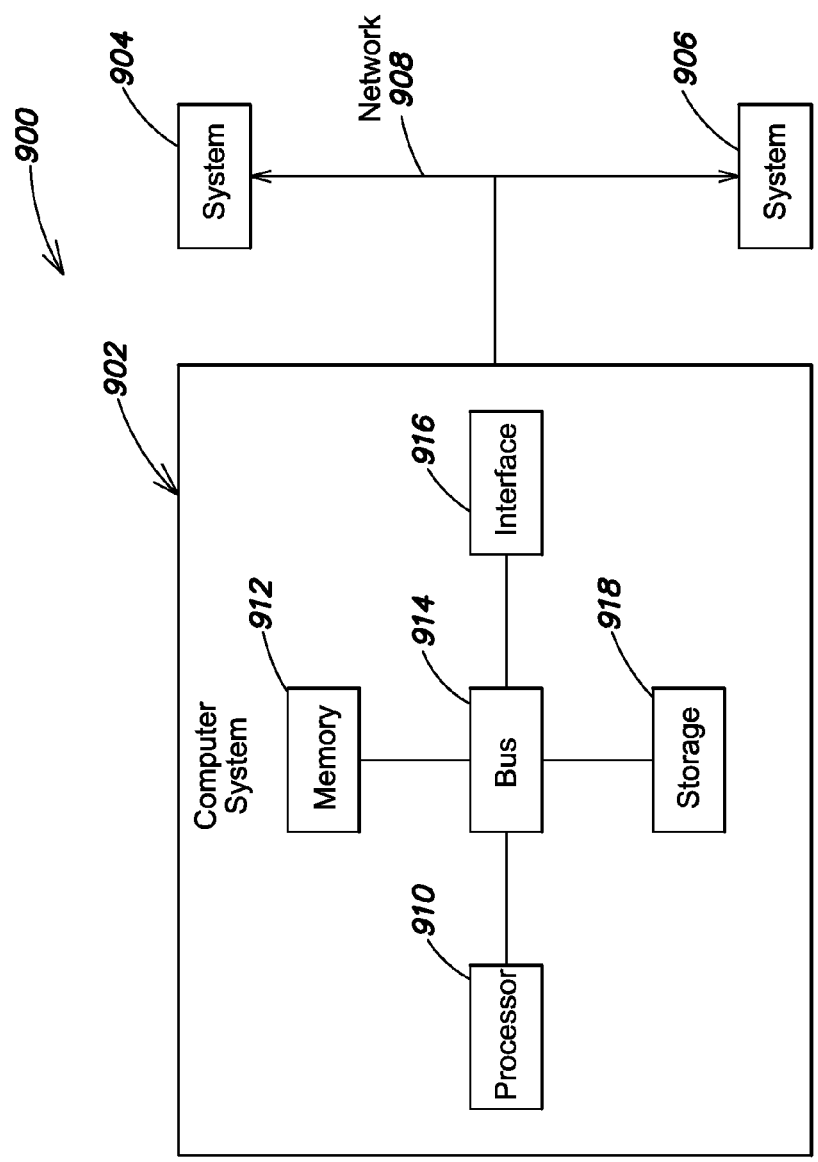
FIG. 9 is a block diagram of one example of a computer system on which aspects and embodiments of the present invention may be implemented.

FIG. 9 is a block diagram of a distributed computer system 900, in which the estimator algorithms/processes may be implemented and executed. The distributed computer system 900 may include one or more computer systems. For example, as illustrated, the distributed computer system 900 includes three computer systems 902, 904 and 906. As shown, the computer systems 902, 904 and 906 are interconnected by, and may exchange data through, a communication network 908. The computer system(s) 902, 904, and/or 906 may also be connected to the DAQ 420 discussed above via the network 908. The network 708 may include any communication network through which computer systems may exchange data. To exchange data via the network 708, the computer systems 702, 704, and 706 and the network 708 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for calibrating a gyroscope can be executed on computer systems 902, 904 and 906 individually and/or in combination. The computer systems 902, 904 and 906 may include personal computing devices, desktop computers, laptop computers, dedicated computing hardware systems, etc.

The estimator algorithms/processes may be implemented as specialized hardware or software executing in one or more of the computer systems 902, 904, 906. Components of computer system 902 are illustrated in FIG. 9; however, those skilled in the art will appreciate that computer systems 904 and 906 may include similar components. As depicted, the computer system 902 includes at least one processor 910 (e.g., a single core or a multi-core processor), a memory 912, a bus 914, input/output interfaces (e.g., 916) and storage 918. The processor 910, which may include one or more microprocessors or other types of controllers, can perform a series of instructions that manipulate data. As shown, the processor 910 is connected to other system components, including a memory 912, by an interconnection element (e.g., the bus 914).

The memory 912 and/or storage 918 may be used for storing programs and data during operation of the computer system 902. For example, the memory 912 may be a relatively high performance, volatile, random access memory such as a dynamic random access memory (DRAM) or static memory (SRAM). In addition, the memory 912 may include any device for storing data, such as a disk drive or other non-volatile storage device, such as flash memory, solid state, or phase-change memory (PCM). In further embodiments, the functions and operations discussed with respect to processing the data obtained from the DAQ 420 and estimating parameters of the gyroscope can be embodied in an application that is executed on the computer system 902 from the memory 912 and/or the storage 918.

Computer system 902 also includes one or more interfaces 916 such as input devices, output devices and combination input/output devices. In some examples, rather than being connected to the DAQ 420 via the network 908, the computer system 902 is connected to the DAQ 420 via the interfaces 916. The interfaces 916 may receive input, provide output, or both. The storage 918 may include a computer-readable and computer-writeable nonvolatile storage medium in which instructions are stored that define a program to be executed by the processor. The storage system 918 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 902 may include an operating system that manages at least a portion of the hardware components (e.g., input/output devices, touch screens, cameras, etc.) included in computer system 902. One or more processors or controllers, such as processor 910, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications may be executed. Further, various embodiments of the estimator algorithms/processes may be implemented as programmed or non-programmed components, or any combination thereof. Thus, various embodiments are not limited to a specific programming language and any suitable programming language may be used.

Although the computer system 902 is shown by way of example as one type of computer system upon which the estimator may be practiced, aspects and embodiments are not limited to being implemented on the computer system, shown in FIG. 9. Various aspects and functions may be practiced on one or more computers or similar devices having different architectures or components than that shown in FIG. 9.

Thus, aspects and embodiments may provide methods for calibrating a gyroscope that do not require rotating the gyroscope, and employ parameter estimation to yield the bias and scale factor parameters used in normal closed-loop sensing and to perform the calibration. As discussed above, the transfer functions which are fit in the estimator are those measured from the side band (demodulated inputs to the sideband (demodulated) outputs). This effectively removes the large thermal sensitivity of mechanical stiffness and resonant frequency. The data is processed into a table of side band outputs versus inputs or side band transfer functions (output divided by input for linear cases). In certain embodiments, the parameters estimated include those listed above in Table 1, and as discussed above, the techniques disclosed herein may advantageously eliminate the need to measure or estimate several redundant variables, such as pick off misalignment and mechanical stiffness, for example, while providing good calibration of the gyroscope.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of calibrating a gyroscope comprising:
   operating the gyroscope in a self-oscillation loop to generate x-axis and y-axis drive signals;
   adding sideband forcing signals to the x-axis and y-axis drive signals to produce pick-off x-axis and y-axis signals;
   measuring the pick-off x-axis and y-axis signals to produce measurement data;
   determining a relative phase between the pick-off x-axis and y-axis signals;
   based on the measurement data and the relative phase, estimating parameters of the gyroscope; and
   based on the measurement data and the estimated parameters, calculating estimated position signals to calibrate the gyroscope.

2. The method of claim 1, further comprising removing feed forward noise from the pick-off x-axis and y-axis signals.

3. The method of claim 1, wherein operating the gyroscope in the self-oscillation loop includes configuring the gyroscope with the self-oscillation loop on the x-axis and the y-axis as a closed-loop sensing channel.

4. The method of claim 3, wherein operating gyroscope in the self-oscillation loop includes applying off-resonant voltage signals to the gyroscope and measuring feed forward terms.

5. The method of claim 4, further comprising exciting gyroscope sidebands using a plurality of input frequencies and recording the measurement data as a function of time, the measurement data including the input frequencies, an x-axis drive voltage ($V_{fx}$), a y-axis drive voltage ($V_{fy}$), an x-axis pick-off voltage ($V_x$), a y-axis pick-off voltage ($V_y$), and a phase reference voltage.

6. The method of claim 5, wherein the plurality of input frequencies are equally spaced.

7. The method of claim 5, further comprising:
reversing the axes of the self-oscillation loop and the closed-loop sensing channel; and
repeating the step of exciting the gyroscope sidebands to produce second measurement data, the second measurement data including a reversed x-axis drive voltage, a reversed y-axis drive voltage, a reversed x-axis pick-off voltage, a reversed y-axis pick-off voltage, and a reversed phase reference voltage.

8. The method of claim 1, further comprising, based on the measurement data and the estimated parameters, determining an angular rate of the gyroscope.

9. The method of claim 1, estimating the parameters includes estimating coupling terms of the sideband forcing signals, damping terms, cross-damping terms, cross-stiffness terms, a phase variation of the oscillator loop from $-\pi/2$, and a magnitude of a ratio of the pick-off x-axis and y-axis signals.

10. The method of claim 9, wherein the coupling terms of the sideband forcing signals include forcing signal misalignments.

11. The method of claim 1, wherein adding the sideband forcing signals includes modulating the pick-off x-axis and y-axis signals.

* * * * *